March 24, 1964 W. GUCKENBURG 3,126,456

MAGNETIC RECORDING HEAD

Filed Sept. 30, 1959 2 Sheets-Sheet 1

INVENTOR
WALTER GUCKENBURG
BY
Brumbaugh, Free, Graves & Donohue
HIS ATTORNEYS

March 24, 1964 W. GUCKENBURG 3,126,456

MAGNETIC RECORDING HEAD

Filed Sept. 30, 1959 2 Sheets-Sheet 2

INVENTOR
WALTER GUCKENBURG
BY
Brumbaugh, Free, Graves & Donohue
HIS ATTORNEYS 3,126,456
MAGNETIC RECORDING HEAD Walter Guckenburg, Stamford, Conn., assignor to Minnesota Mining & Manufacturing Company, St. Paul, Minn., a corporation of Delaware Filed Sept. 30, 1959, Ser. No. 843,573
6 Claims. (Cl. 179—100.2)

The present invention relates to magnetic recording heads and more particularly to new and improved magnetic heads of this character that are characterized by greatly improved performance as compared with the heads that are currently available.

In the present practice, conventional ring type magnetic heads are used for recording operations with magnetic media such as magnetic tape, for example. Such heads usually comprise a magnetic core in the form of a ring having spaced apart pole pieces defining a small gap, with one or more windings on the core. While such heads are effective, their performance leaves much to be desired, particularly when high quality recordings or reproductions are desired at very low tape speeds (i.e., 1⅞ inches per second). In fact, the conditions required for satisfactory recording over a large wavelength range (viz., a homogeneous recording field strength throughout the thickness of the magnetic coating on the tape and an effective gap length that is small as compared with the shortest wavelength to be recorded) cannot be achieved with a conventional ring-type head.

For a ring-type head with a gap small enough (1–5 microns) to record or reproduce very short wavelengths ($\lambda<5$ microns), and with a field strong enough to record the low frequencies ($\lambda>100$ microns), it is found that the field strength of the gap at its surface, in the center is many times higher than that on the back of the magnetic coating on the tape, which may be say 10 microns thick. The difference between the applied field on the front and back of the tape coating can, of course, be reduced by lengthening the gap, but only at the expense of the high frequency response. As a result, any conventional ring-type head system is usually a compromise.

Another disadvantage of conventional ring-type heads is that, in recording, different values of high frequency bias are required obtain maximum output in the high and low frequency ranges, respectively. The ratio between the optimum bias values for the low and the high frequency ranges (the optimum bias ratio) depends mainly on tape thickness and it is about 3:1 for a tape coating thickness of 9 microns.

It is an object of the invention, accordingly to provide new and improved magnetic recording-reproducing heads that are essentially free from the above noted deficiencies of the prior art.

Another object of the invention is to provide new and improved magnetic recording reproducing heads of the above character that are capable or recording or reproducing a wide frequency range at low tape transport speeds.

Broadly speaking, magnetic recording reproducing head means according to the invention comprises a first magnetic circuit linking winding means and having spaced apart gap defining pole faces at least one of which is adapted to be disposed adjacent the uncoated side of a magnetic tape, and a second magnetic circuit element having a gap adapted to be disposed substantially in contact with the coated side of the tape near the first magnetic circuit in such fashion as to reduce the rate of fall of the field strength in a direction perpendicular to the plane of the tape and also to reduce the vertical component of the vertical field i.e., the component of the field in a direction perpendicular to the plane of the tape in the vicinity of the gap in said second magnetic circuit.

In one embodiment, the first magnetic circuit may comprise a conventional ring-type magnetic head disposed with its gap adjacent the back or uncoated side of the tape. The second magnetic circuit element may also be formed by a second conventional ring-type head having a small gap substantially in contact with the coated side of the tape opposite the first head. Alternatively, the second magnetic circuit may comprine spaced apart magnetic members such as single laminations having adjacent pole faces defining a small gap, for example.

According to another embodiment of the invention, the first magnetic circuit may comprise a ring-type head having its adjacent gap defining pole faces positioned on opposite sides of the tape. In this form, the second magnetic circuit element may comprise a piece of magnetic material, say, a single lamination, having a pole face positioned adjacent one of the pole faces of the first magnetic circuit so as to form therewith a small gap substantially in contact with the coated side of the tape. A further simplification may be effected by using for the first magnetic circuit an air coil alone or a small bar of magnetic material such as a single lamination carrying a winding, the lamination having a pole face disposed adjacent the uncoated side of the tape. The second magnetic circuit element in this case may be formed by spaced apart magnetic members such as single laminations forming a small gap at the coated side of the tape opposite the first magnetic circuit.

The invention may be better understood from the following detailed description of several representtaive forms thereof, taken in conjunction with the accompanying drawings in which.

Figure 1:
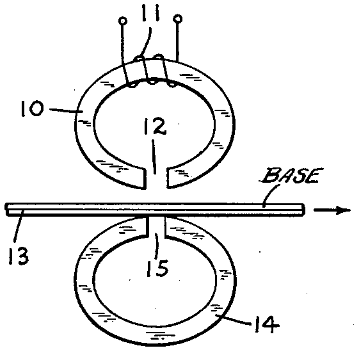
FIG. 1 is a schematic diagram of one form of magnetic head constructed according to the invention.

In FIG. 1, a magnetic head structure is shown which comprises a conventional ring-type head 10 linking a winding or windings 11 and having a small gap 12 adjacent the back or uncoated side of a conventional magnetic tape 13. The tape 13 is adapted to be transported in the direction indicated by the arrow by conventional tape transport mechanism (not shown). At the coated side of the tape 13 is a ring-type core 14 made of a suitable magnetic material such as the nickel-copper-iron alloy marketed as "Mumetal," having a small gap 15 opposite the gap 12 in the back head 10. The widths of the gaps 15 and 12 may be one and ten microns, respectively, although this is not at all critical, and the spacing between the head 10 and the core 14 across the tape may be several mils.

Figure 2:
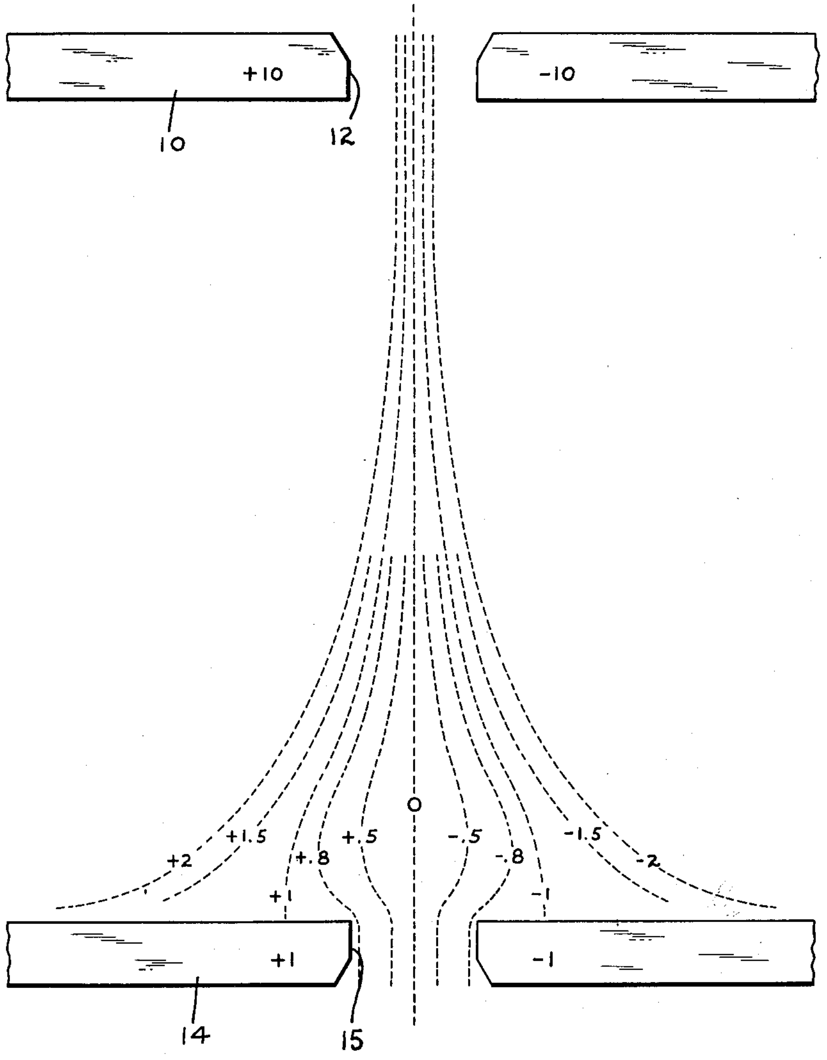
FIG. 2 is a graph illustrating an electrical analog potential pattern for the head shown in FIG. 1.

The electrical analog potential pattern shown in FIG. 2 for a magnetic head structure of the type illustrated in FIG. 1 indicates a concentration of the field near each of the gaps. For example, the potential of the pole pieces of the upper head 10 may be +10 and −10 and the potential of the recording head 14 may be +1 and −1. In this case, all potential lines in the gap 12 of the back head 10 less than ±1 can reach the gap 15 of the front head 14, whereas all potential lines greater than ±1 in value are deflected around the recording gap 15. It will be noted that in the neighborhood of the gap 15, a very rapid extinction of the field takes place along the upper surface of the poles, whereas the extinction rate of the field is small in the direction normal to the plane formed by said upper surfaces of the poles.

In tests with a magnetic head structure of the type shown in FIG. 1, it was found possible to obtain a bias ratio close to 1:1 over the whole audio range. Further, at 10 kilocycles per second a gain of 15 db was obtained as compared with a single head recording with bias fixed to optimum output $f=50$ cycles per second (c.p.s.). At 15 kc./sec. the gain was 25 db. In addition to this, in the low frequency range, a gain of 7 db was obtained at 100 cycles per second (c.p.s.).

Figure 3:
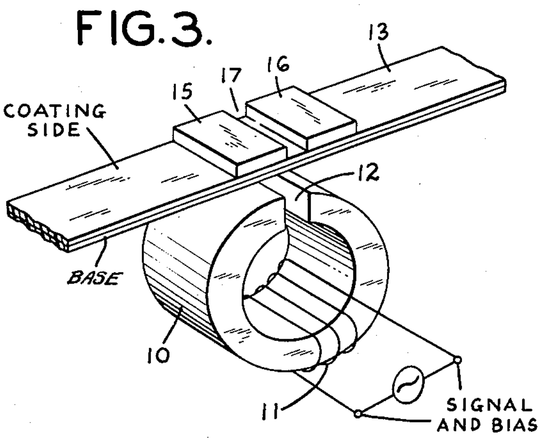
FIG. 3 is a schematic diagram of a simplified form of head structure according to the invention.

It has been found that the field of the back gap 12 is concentrated by the pole pieces of the recording head 14 and a second source of magnetomotive force on the latter is not necessary. Moreover, it appears that the shunting effect produced by the portion of the core 14 beyond the pole faces is disadvantageous so that this portion may be omitted. As shown in FIG. 3, further improvement in performance may be gotten by using only a pair of magnetic members 15 and 16 instead of a closed core 14. The size of the magnetic members 15 and 16 is not critical but the gap 17 between them should be small enough (e.g., 1 micron) to insure recordings of the desired quality.

With a magnetic head structure as in FIG. 3 having a gap 12 of 2 mils, a front gap 17 of about 5 microns, a back gap to front gap spacing of 2 to 5 mils, the back gap trailing about 5 mils, about 5 db more signal has been obtained at all frequencies up to 15 kilocycles per second.

In practice, good 1 micron gaps can be made with relative ease since it is not necessary for the poles to be laminated. With the structure shown in FIG. 4, a 1:1 bias ratio between 50 cycles per second (c.p.s.) and 15 kc./sec. can readily be obtained.

Figures 4, 5, 6:
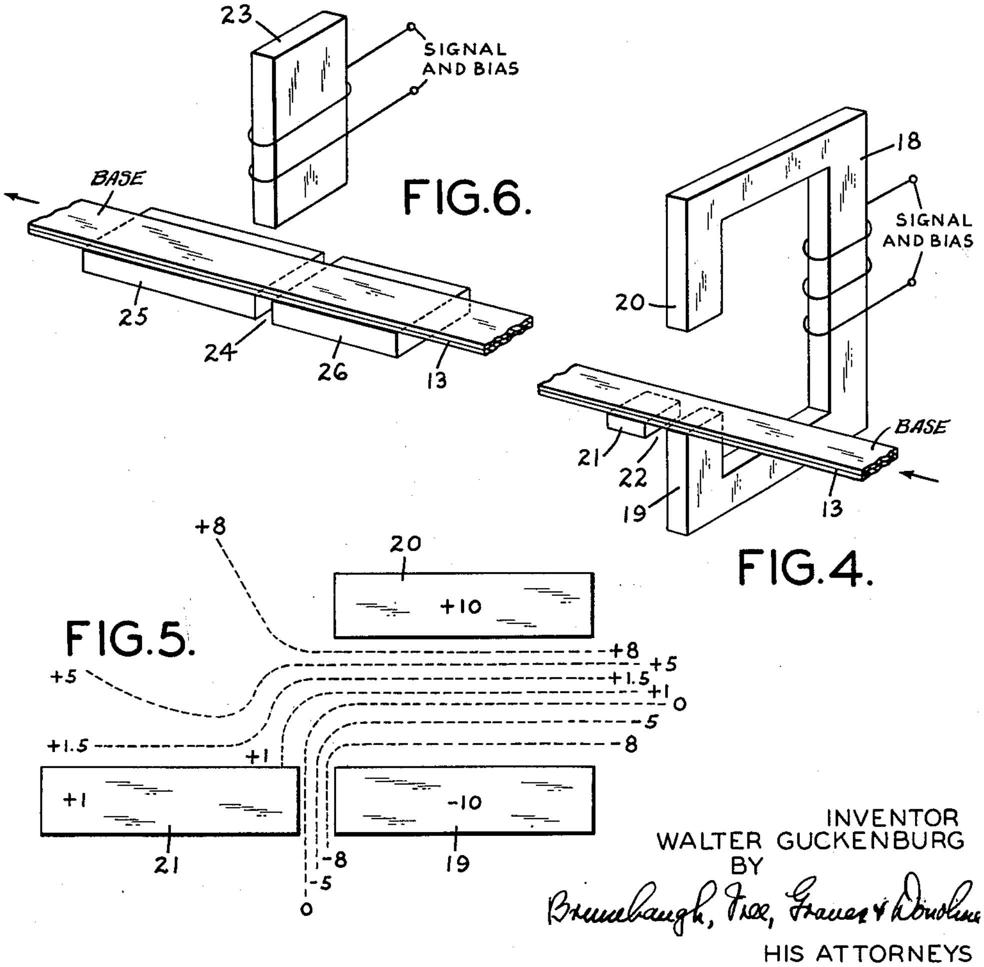
FIG. 4 illustrates schematically a three pole magnetic head according to the invention.
FIG. 5 is a graph of a typical electrical analog potential pattern for the head shown in FIG. 4.
FIG. 6 illustrates a further simplified form of magnetic head according to the invention.

The magnetic head structure shown in FIG. 4 can be further simplified by substituting for the ring-type core 18 a single pole piece 23 made of a single lamination of a suitable high saturation magnetic material such as the cobalt-iron alloy marketed as "Permendur," as shown in FIG. 6. In this case, the recording gap 24 is formed by spaced apart magnetic members 25 and 26 in contact with the coated side of the tape 13. These may be made of any suitable hard, high permeability material such as alfenol.

The pole piece 23 should be offset from a median plane through the gap 24 in the direction opposite the direction of tape transport so as to produce a magnetic field distribution comparable to that shown in FIG. 5. For high speed recording using high frequency bias, the pole piece 24 should preferably be made of ferrite iron.

The electrical analogue potential pattern shown in FIGURE 5 indicates a concentration of the field near the gap between pole pieces 19 and 21. For example, the potential of the pole piece of the upper head 20 may be +10 and the potential of the pole pieces 19 and 21 of the recording head may be —10 and +1, respectively. In this case, all potential lines between pole pieces 19 and 20 less than +1 and greater than —10 reach the gap of the recording head, whereas all potential lines greater than +1 in value are deflected around the recording gap. It will be noted that in the neighborhood of the gap, a very rapid extinction of the field takes place along the upper surface of pole 21, whereas the extinction rate of the field is small in the direction normal to the plane formed by the upper surfaces of pole pieces 19 and 21.

Actually, it is not necessary to provide magnetic cores for the exciting field windings in the forms of the invention shown in FIGS. 3 and 6 since good results can be achieved with the exciting coils in air alone.

The invention thus provides novel and highly effective magnetic recording heads that are markedly superior to conventional ring-type heads. By generating the exciting fields at the back or uncoated side of the tape and using a gap defining magnetic circuit component at the coated side of the tape, it is possible to maintain a substantially uniform recording field through the thickness of the tape. Hence, a substantially 1:1 optimum bias ratio can be achieved over a wide frequency range. Further, since multiple laminations are not required, it is a relatively simple matter to construct magnetic heads with very small gaps (e.g., 1 micron in width). Moreover, since the field generating means is separated from the metal defining the recording gap, the best available materials can be used for each, ferrite for the former and alfenol for the latter. Higher tape speeds can be used and frequencies up to 5 megacycles can be recorded so that the recording head of the invention may be used for video recording.

The several specific embodiments described herein are intended to be merely illustrative, and are susceptible of modification in form and detail within the scope of the following claims.

I claim:

1. Magnetic recording apparatus comprising means defining a tape transport path for tape having a magnetic coating on at least one surface, separate, side by side magnetic members having short surfaces disposed adjacent and generally parallel to a portion of said tape transport path on the side adjacent to the coated tape surface parallel to the plane of said coated tape surface and in contact therewith and having opposed edges defining a gap transverse and normal to said path, core means on the other side of said path having a pole piece portion in close proximity to said gap and other portions all spaced farther away from said gap, and winding means on said core means constituting the sole source of magnetomotive force for establishing a recording magnetic field in said tape transport path in the environs of said gap in which both the rate of fall of field strength in a direction away from the plane of said short surfaces, and the field component normal to the plane of said surfaces are reduced.

2. Magnetic recording apparatus comprising means defiing a tape transport path for tape having a magnetic coating, a pair of separate, short pieces of magnetic material disposed end to end adjacent and generally parallel to a portion of said tape transport path on the side adjacent to the coated tape surface parallel to the plane of said coated tape surface and having opposed edges defining a first narrow gap extending transversely of said path and normal thereto, ring-type magnetic core means having spaced pole pieces defining a second narrow gap at the other side of and adjacent to said path and extending transversely thereof and having other portions all spaced farther away from said second gap, said first and second gaps being in proximity to one another on opposite sides of said path, and winding means on said core means and constituting the sole source of magnetomotive force for magnetizing said short strips of magnetic material and said magnetic core means to produce a recording magnetic field in said tape transport path in the immediate vicinity of said first gap in which the field component in the general direction from said first gap to said second gap is reduced, and the rate of fall of field strength in the said general direction is reduced.

3. Magnetic recording apparatus comprising means defining a tape transport path for tape having a magnetic coating, a pair of separate, short pieces of magnetic material disposed end to end adjacent and generally parallel to a portion of said tape transport path on the side adjacnt to the coated tape surface parallel to the plane of said coated tape surface and having opposed edges defining a narrow gap transversely of and normal to said path, a pole member at the other side of said path having a pole face adjacent and substantially parallel to said path, opposite to and in the vicinity of said gap and a body extending away from said tape transport path, and winding means on said pole member and constituting the sole source of magnetomotive force for producing a magnetic flux in said short pieces of magnetic material and the pole member to produce a recording magnetic field in said tape transport path in the immediate vicinity of said gap in which the field component in the general direction from said gap to said pole member is reduced and the rate of fall of field strength in the said general direction is reduced.

4. Magnetic recording apparatus comprising means defining a tape transport path for tape having a magnetic coating, ring-type core means having spaced opposed pole pieces on opposite sides of said path and adjacent thereto, a short piece of magnetic material adjacent and generally parallel to said path on the side adjacent to said coating and having an edge in closely spaced relation to said core means near one of the said opposed pole pieces so as to form therewith a narrow gap normal to said path and transversely thereto and winding means on said core means and constituting the sole magnetomotive force for producing a magnetic flux in said short piece of magnetic material and said core means to produce a recording field in the portion of said tape transport path in the immediate vicinity of said gap in which the field component in the general direction from said opposed pole piece adjacent said short piece of magnetic material to the other opposed pole piece is reduced, and the rate of fall of field strength in said general direction is reduced.

5. Magnetic recording apparatus comprising means defining a tape transport path for tape having a magnetic coating, a pair of separate, short pieces of hard, high permeability, magnetic material having surfacs disposed adjacent and generally parallel to a portion of said tape transport path and having opposed edges defining a first narrow gap extending transversely of said path on the side adjacent to said coating parallel to the plane of said coating, ring-type magnetic core means of high magnetic permeability having spaced pole pieces defining a second narrow gap at the other side of and adjacent said path and extending transversely thereto and having other portions all disposed farther away from said gap, said first and second gaps being in proximity to one another on opposite sides of said path with said second gap trailing said first gap, and winding means on said core means and constituting the sole source of magnetomotive force for producing a magnetic flux in said short strips of magnetic material and said magnetic core means to produce a recording magnetic field in the portion of said tape transport path in the immediate vicinity of said first gap in which the field component normal to the plane of said surfaces is reduced, and the rate of fall of field strength in a direction away from the plane of said surfaces is reduced.

6. Magnetic recording apparatus comprising means defining a tape transport path for tape having a magnetic coating, a pair of separate, short pieces of hard, high permeability magnetic material having surfaces disposed adjacent and generally parallel to a portion of said tape transport path and having opposed edges defining a narrow gap extending transversely of said path on the side adjacent to said coating parallel to the plane of said coating, a high magnetic permeability pole member having a pole face adjacent and substantially parallel to said path opposite and in the vicinity of said gap and a body portion extending substantially normal to said tape transport path, said pole member being offset from a median plane through said gap in a direction opposite the direction of tape transport, and winding means on said core means and constituting the sole source of magnetomotive force for producing a magnetic flux in said pieces of magnetic material and said pole member to produce a recording magnetic field in the portion of said tape transport path in the immediate vicinity of said gap in which the field component normal to the plane of said surfaces is reduced, and the rate of fall of field strength in a direction away from the plane of said surfaces is reduced.

References Cited in the file of this patent

OTHER REFERENCES

| | | |
|---|---|---|
| 2,423,339 | Newman | July 1, 1947 |
| 2,628,285 | Camras | Feb. 10, 1953 |
| 2,675,429 | Rohling | Apr. 13, 1954 |
| 2,854,524 | Went et al. | Sept. 30, 1958 |
| 2,873,319 | Mee | Feb. 10, 1959 |
| 2,932,697 | Bogen et al. | Apr. 12, 1960 |
| 2,987,583 | Camras | June 6, 1961 |